United States Patent [19]
Kuras et al.

[11] 4,293,946
[45] Oct. 6, 1981

[54] TRILATERAL DUPLEX PATH CONFERENCING SYSTEM WITH BROADCAST CAPABILITY

[75] Inventors: Michael L. Kuras, Stratford; Daniel C. Upp, Easton; Herbert J. Toegel, Fairfield, all of Conn.

[73] Assignee: International Telephone and Telegraph Corporation, New York, N.Y.

[21] Appl. No.: 96,599

[22] Filed: Nov. 21, 1979

[51] Int. Cl.³ .............................................. H04M 3/56
[52] U.S. Cl. .................................. 370/62; 179/18 BC; 179/1 B
[58] Field of Search ............... 179/18 BC, 1 CN, 1 B; 370/62, 67

[56] References Cited

U.S. PATENT DOCUMENTS

| | | | |
|---|---|---|---|
| 3,551,600 | 12/1970 | Berch | 179/18 BC |
| 3,643,030 | 2/1972 | Sparrendahl | 179/18 BC |
| 4,201,890 | 5/1980 | Lawrence | 370/68 |
| 4,203,001 | 5/1980 | Condon | 179/18 BC |

Primary Examiner—David L. Stewart
Attorney, Agent, or Firm—John T. O'Halloran; Jeffrey P. Morris

[57] ABSTRACT

A system is disclosed which permits information received from any data terminal or telephone subscriber line at any interface to a digital network to be transmitted to any number of other terminals at any or all of the interfaces to the digital network. The system herein described also permits any terminal at any interface of the digital network to be conferenced, with up to N other terminals at any or all of the interfaces to the digital network where N can be made to depend solely upon the topology and single path transmission delay of the digital network itself. A facility is provided which is independently provisioned at every interface to the digital network and which is independently and concurrently available to any number of combinations of terminals and simplex paths at those interfaces. A broadcast capability is also provided whereby telecommunication information can be simultaneously transmitted from a source terminal to a plurality of destination terminals.

14 Claims, 16 Drawing Figures

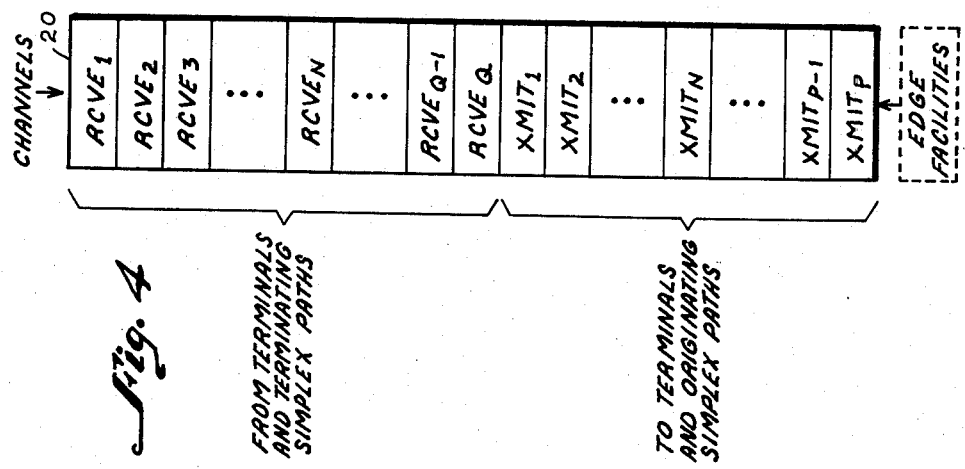
Fig. 4
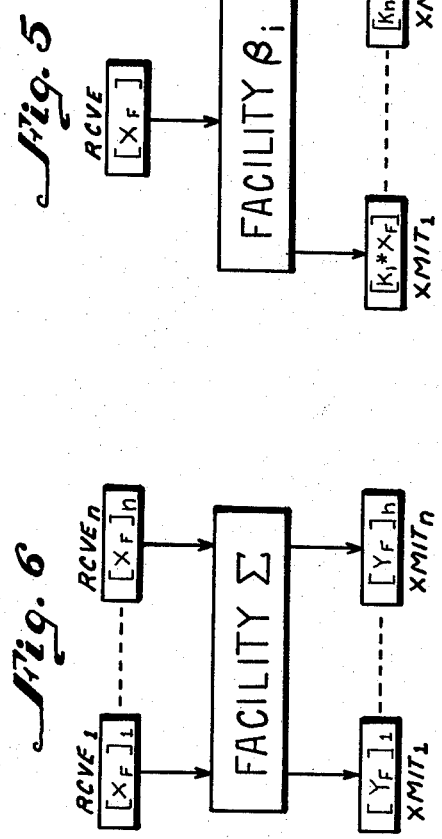
Fig. 5
Fig. 6
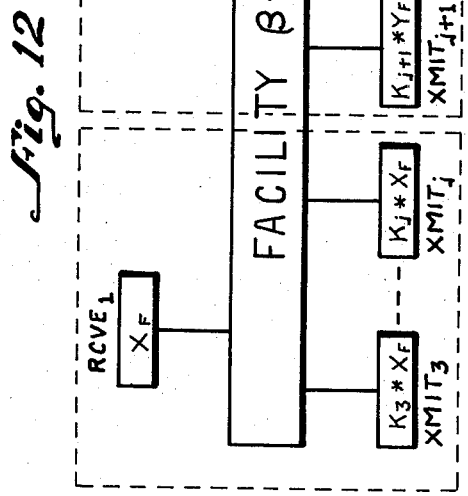
Fig. 12

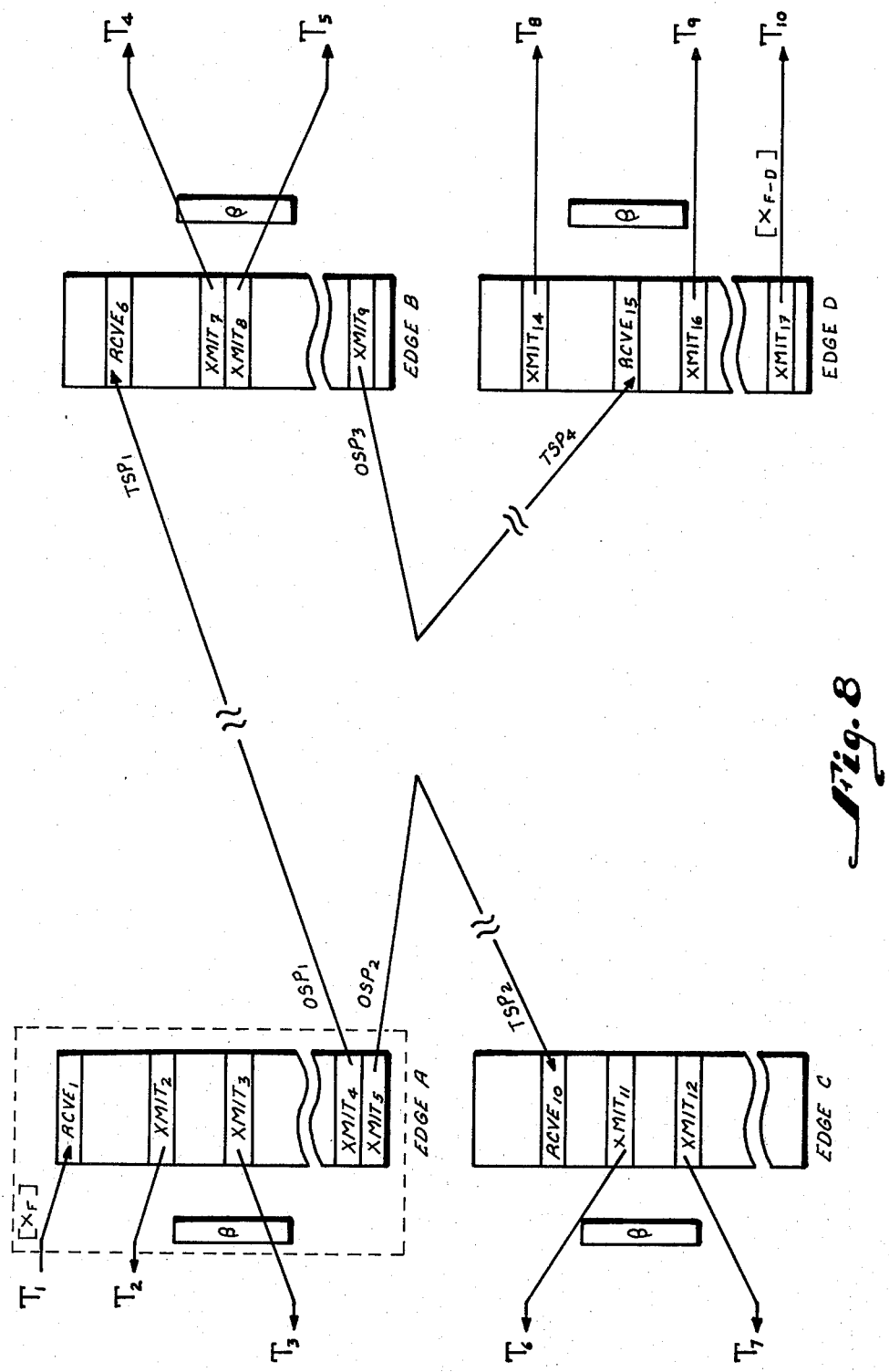

$$[X_F] = [[B_F^*] + [C_{F-D}^*]]$$

$$[Y_F] = [[A_F^*] + [C_{F-D}^*]]$$

$$[Z_F] = [[A_F^*] + [B_{F-D}^*]]$$

TRILATERAL DUPLEX PATH CONFERENCING SYSTEM WITH BROADCAST CAPABILITY

CROSS REFERENCE TO RELATED APPLICATION

Reference is made to related application Ser. No. 888,582, filed Mar. 17, 1978, now U.S. Pat. No. 4,201,890 issued May 6, 1980, of Alan J. Lawrence, et al entitled "Multiport Digital Switching Element", now U.S. Pat. No. 4,201,890, assigned to the same assignee as in the instant application.

BACKGROUND OF THE INVENTION

1. Field of the Invention

The present invention relates generally to distributed control digital communication systems and more particularly to the provision for broadcasting of information from a source to a plurality of destinations in such systems. The present invention also relates to the provision of a conferencing capability between a plurality of terminals in such a system and to the provision of a plurality of such conferences within the overall communication system. The present invention is particularly applicable to the field of telephony.

2. Description of the Prior Art

Conventional telephone exchanges arrange for multiparty conferencing conversation by providing one conferencing bridge for each subscriber connected to the network. The conference signals must be routed to a conference circuit that incorporates the conference bridge and is generally extraneous to the network that makes the standard interconnections, i.e. for two-party telephone calls. The conference bridge, therefore, requires speech paths in addition to the number of paths required to complete two-party connections; first, to carry the speech signals from the network to the bridge and, second, from the bridge to the network.

Although the conference circuit and bridge provided allow conference calls to be completed among any group of subscribers, the cost of the additional circuitry and of the bridges themselves is substantial and requires additional space for this equipment at the switching facility than otherwise would be required.

SUMMARY OF THE INVENTION

A system is herein described which permits the information received from any terminal at any edge of a digital network to be transmitted, with selective scaling, to any number of other terminals at any or all of the edges of a digital network. The system herein described also permits any terminal at any edge of a digital network to be conferenced, with up to N other terminals at any or all of the edges of a digital network where N can be made to depend solely upon the topology and single path transmission delay of the digital network itself. The system is continuously available to any and all terminals irrespective of whether or not the system is concurrently utilized at any number of other terminals at any or all of the edges of the digital network. The system is independently provisioned at every edge of digital network and is independently and concurrently available to any number of meaningful combinations of terminals and simplex or duplex paths at those edges. A broadcast capability is also provided, permitting the transmission of signals to any number of subscribers.

BRIEF DESCRIPTION OF THE DRAWINGS

FIG. 4 is illustrative of time slot interchange at a digital network edge;

FIG. 5 is illustrative of generalized hardware for implementing broadcasting;

FIG. 6 is illustrative of the use of the hardware of FIG. 5 for conferencing;

FIG. 8 is illustrative of switching paths thru a switching network in a multiple edge broadcasting system having a plurality of terminals and edges;

FIG. 12 illustrates two broadcasting systems using a common broadcast facility at a single network edge;

DESCRIPTION OF THE PREFERRED EMBODIMENTS

PCM data is derived at the various terminals serviced by a telephone switching system from digital trunk lines or from telephone line circuits of the type described in U.S. Pat. No. 4,161,633 and are representative of the digitized data constituting telephone conversation. Such information is multiplexed into 32-channel PCM digital lines providing transmission paths for the 32 channels of TDM digital information in bit-serial format. Each frame of TDM format is comprised of the 32 channels, with each channel having, for example, 16 bits of information at a bit transmission rate of 4.096 mb/s. When digital speech samples are transmitted anywhere within the system to or from a path terminal, the digital speech samples must be time multiplexed into the correct channels on transmission links between the switching elements within the telephone digital switching matrix, as is described in detail in the referenced A. Lawrence, et al application. Such switching elements provide time slot interchange which may be defined as transportation of data on one channel to another channel. In a system in accordance with the present invention, the terminal interface may provide, for example, an interface to 60 low traffic terminals or 30 high traffic trunk terminals with access switching to the digital switching network being provided, also as described in the copending application of A. Lawrence, et al. In a distributed control digital switching system, telephone line terminal circuitry is provided for servicing a plurality of circuit clusters, each of which clusters is associated with a plurality of telephone lines, i.e. 60 lines. Each terminal cluster includes a terminal interface and a processor dedicated to certain processing functions, such as path setup thru the switching network or terminal control for lines coupled to the terminal interface within the terminal cluster. Each terminal interface includes a bi-directional transmission link to couple to the network through the access switches to provide for data transmission between the terminal interface and the switching matrix. By the transmission of data over the path established thru the switching network to the various subscriber lines intercoupled by each terminal interface, telephone conversation is achieved between terminals.

Conferencing as used herein is defined as an interconnection between N subscribers, such that each of the N subscribers is connected to all other subscribers, and can hear each of the other subscribers.

Broadcasting as used herein is defined as a mechanism for transmitting a particular signal (tone, announcement, subscriber, etc.) to any one of, any number of, or all of the subscribers.

Figure 1:
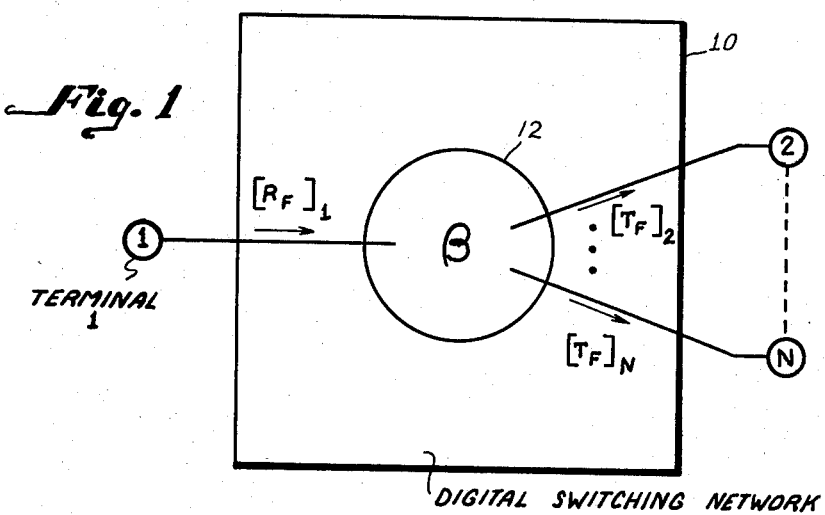
FIG. 1 is a generalized diagram of a broadcasting system.

FIG. 1 illustrates generally at 10 a broadcasting system in a digital communications network. In such a broadcasting system involving N terminals connected to the digital network, one terminal here designated terminal 1 serves as an information source and the remaining terminals here designated as terminals 2 through terminal N serve as information destinations. The broadcasting system periodically receives from the information source terminal 1 digitized units of information, concurrently scales as appropriate and then transmits these digitized units of information to the information destination terminals 2 thru N. The information is represented at 12 by $\beta$. The periodicity with which the broadcasting system receives digitized units of information may be representative of, for example, instantaneous samples of speech.

A new unit of digitized information is received by the broadcasting system 10 from the information source terminal 1 once per frame. In FIG. 1, this operation is represented as $[R_F]_1$ where the R designates received information, the inner subscript designates the current frame time and the other subscript designates the source terminal, in the illustrated example, terminal 1. The first unit of information received is designated $[R_0]_1$, the next is designated $[R_1]_1$ and so forth. Digitized units of information are delivered by the broadcasting system to all of the destination terminals interconnected thereto once per frame. Referring now to FIG. 1, a broadcasting system is illustrated wherein digitized information is represented as $[T_F]_j$ where T designates transmitted information, the inner subscript designates the current frame time and the outer subscript designates an information destination terminal, such as terminal j where $2 \leq j \leq N$. In general, $[T_F]_j = k_j*[R_{F-Dj}]_1$ where $k_j$ is a scaling factor applied to information delivered to terminal j and $D_j$ is the information transfer delay as measured in frames. In particular, the first unit of information delivered to terminal j is $[T_{Dj}]_j$ which is equal to $k_j*[R_o]_1$.

Figure 2:
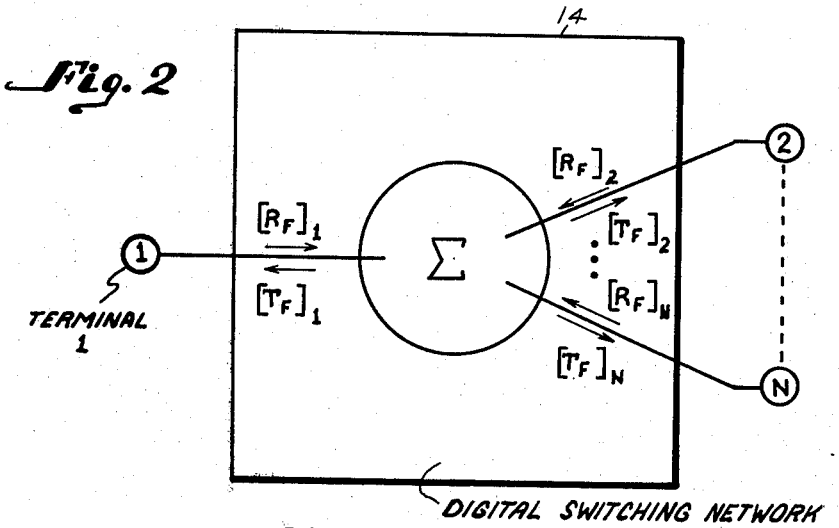
FIG. 2 is a generalized diagram of a conferencing system.

FIG. 2 illustrates a conferencing system in any digital network such as network 14. In such a conferencing system involving N terminals connected to the digital network 14, each terminal can serve as both an information source and information destination. The conferencing system periodically receives digitized units of information from each terminal and delivers to each terminal a suitable composite of the information from the other N−1 terminals. Reception from and delivery to each terminal of the appropriate information occurs concurrently for all terminals involved with a periodicity determined by the frame rate of the digital network. The digitized units of information may, for example, represent instantaneous samples of speech.

A new unit of digitized information is received from each terminal by the conferencing system once per frame. In FIG. 2, this is represented as $[R_F]_j$ which employs the same notational significance as used in FIG. 1. A unit of digitized information is delivered to each terminal by the conferencing system once per frame.

In general, $[T_F]_j = [S_F]_j$ if MIN $\leq [S_F]_j \leq$ MAX    Eq. (1-1)
$= $ MIN if MIN $> [S_F]_j$
$= $ MAX if MAX $< [S_F]_j$ where $$[S_F]_j = \sum_{\substack{i=1 \\ i \neq j}}^{N} k_i * [R_{F-D_i}]_i \quad \text{Eq. (1-2)}$$

where $k_i$ is a scaling function, $f_j([R_{F-D_1}]_1, [R_{F-D_2}]_2, \ldots,$
$[R_{F-D_{i-1}}]_{i-1}, [R_{F-D_{i+1}}]_{i+1}, \ldots,$
$[R_{F-D_{N-1}}]_{N-1}, [R_{F-D_N}]_N)$ and MIN and MAX are the smallest and largest digital values that can be expressed in one digital unit of information. The choice of MIN or MAX over $[S_F]_j$ is usually referred to as clipping.

The interface between a digital network and some number of information terminals may be defined as an edge of the digital network; and such terminals are defined as being connected to the digital network at that edge. The F/n edge includes the first and in some cases the only stage of switching in the digital network. For the system described herein, the edge is defined as containing a time slot interchange as the realization of the first stage of switching.

All individual paths in a digital network are simplex. Such simplex paths in a digital network originate at an edge of the digital network and they terminate at an edge of the digital network. Two simplex paths are complementary if the two paths are associated with the same edges and exhibit opposite directionality, i.e. bi-directionality. If the only possible means of interconnecting two terminals requires a path through the digital network then those two terminals are connected to different edges of the digital network. The topologically simplest digital network has only one edge.

Figure 3:
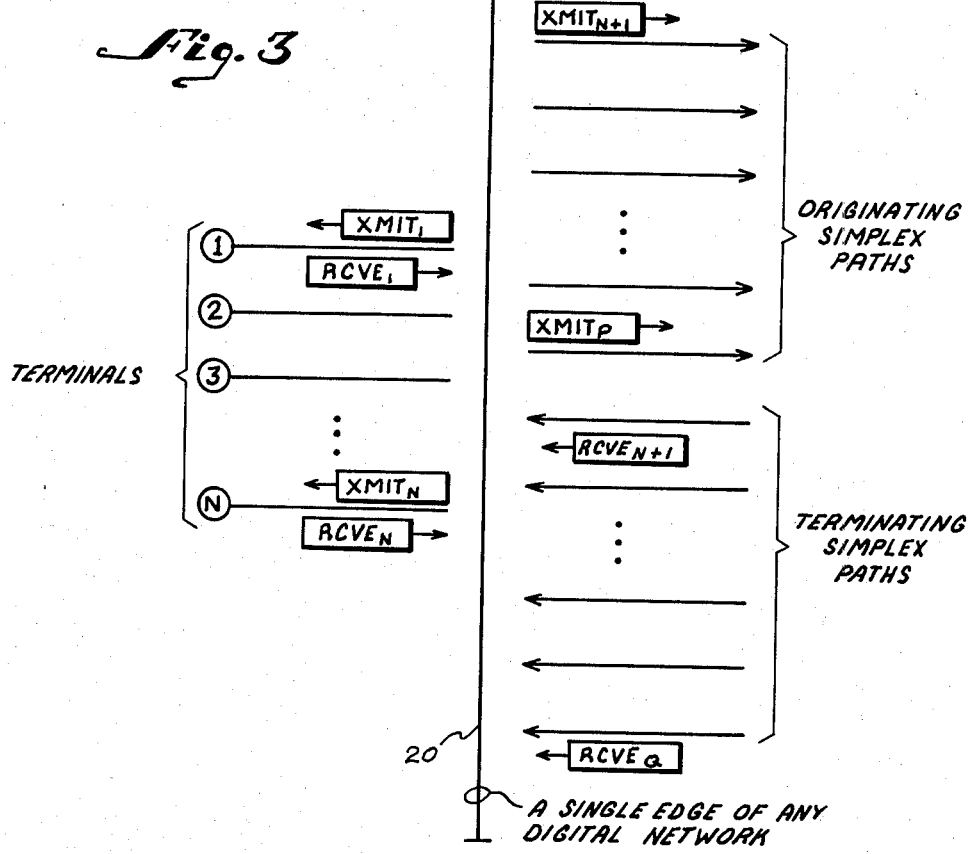
FIG. 3 is a diagrammatic representation of an edge of a digital network.

Digitized units of information are accepted from inlets to the digital network and delivered to outlets of the digital network at the frame rate of the information coupled to the digital network. With reference to FIG. 3, the inlets from and the outlets to terminals at an edge are referred to as channels and correspond to time slots of the time slot interchange of the edge 20 of the digital switch. Each terminal corresponds to one inlet and one outlet which are also referred to as one Receive Channel (RCVE) and one Transmit Channel (XMIT) of the edge 20. Simplex paths originating at a given edge are represented by Transmit Channels (XMIT) and simplex paths terminating at a given edge are represented by Receive Channels (RCVE). This is illustrated in FIG. 3, wherein Terminal 1 is connected to the edge 20 by XMIT$_1$ channel and RCVE$_1$ channel, Terminal N is connected to the edge 20 by XMIT$_N$ channel and RCVE$_N$ channel, and so forth. Whenever simplex paths originating at edge 20 exist, they are represented by Transmit Channels XMIT$_{N+1}$ through XMIT$_P$. Whenever simplex paths terminating at the edge exist, they are represented by Receive Channels RCVE$_{N+1}$ through RCVE$_Q$. There is usually an identical maximum for the values of P and Q in XMIT$_P$ and RCVE$_Q$. A complementary pair of simplex paths are represented at a given edge by a Transmit Channel and a Receive Channel.

FIG. 4 illustrates the principal that an edge of a digital network such as edge 20 can be represented as a set of channels within a frame and the hardware associated with those channels individually and collectively.

FIG. 5 illustrates the principal of utilizing a broadcast facility at an edge of a digital network. The digitized unit of information accepted by a given Receive Channel RCVE at the start of frame time F is represented as $[X_F]$.

In the same frame time, this digitized unit of information is appropriately scaled and delivered to a set of Transmit Channels XMIT$_1$ through XMIT$_N$. In FIG. 5, $k_i$ represents a scaling factor applied to $[X_F]$, as it is delivered to XMIT$_i$, which can be used to modify the sign and/or magnitude of the digitized unit of information $[X_F]$. The digitized unit of information resulting from this scaling is represented as $[k_i * X_F]$.

FIG. 6 illustrates the principal of applying the conferencing system at an edge of a digital network. Once during each frame time a digitized unit of information is accepted from each Receive Channel RCVE$_i$, $1 \leq i \leq N$, and replaces, as available, the information accepted in the previous frame time. For RCVE$_1$, $[X_F]_1$ replaces $[X_{F-1}]_1$. At any instant during the frame time F, either $[X_F]_i$ or $[X_{F-1}]_i$ is currently available as the most recently received information from RCVE$_i$ and is represented as $[X_F^*]_i$.

Once during each frame time F, a digitized unit of information is delivered to each Transmit Channel XMIT$_i$, $1 \leq i \leq N$. This digitized unit of information is represented as $[Y_F]_i$. The value of $[Y_F]_i$ is then algebraic summation of the values currently available from all Receive Channels except RCVE$_i$, each of which is appropriately scaled, provided the result does not exceed the largest or smallest values that can be represented in one digitized unit of information, MAX and MIN, or, $$[Y_F]_i = S_i \text{ if MIN} \leq S_i \leq \text{MAX}$$
$$= \text{MIN if MIN} > S_i$$
$$= \text{MAX if MAX} < S_i \text{ for } 1 \leq i \leq n$$

where $$S_i = \sum_{\substack{j=1 \\ j \neq i}}^{n} k_j [X_F^*]_j$$

with $k_j = f([X_F^*]_1, \ldots, [X_F^*]_{j-1}, [X_F^*]_{j+1}, \ldots, [X_F^*]_n)$.

Figure 7:
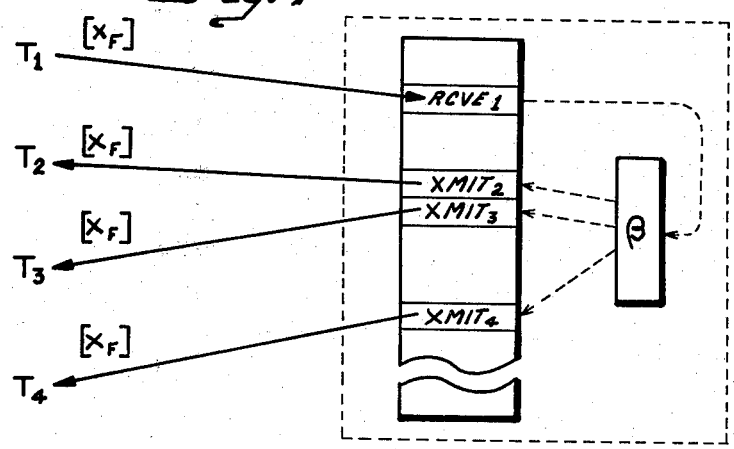
FIG. 7 is illustrative of a broadcasting system having four terminals at a network edge.

The formation of a broadcast system (B) involves the utilization of at least one broadcast facility, as described herein. FIG. 7 illustrates one case of a broadcast system employed at one edge of a digital network only. In this case, Terminal T$_1$, through its inlet Receive Channel RCVE, delivers information to the Digital Network which concurrently repeats this information to Terminals T$_2$, T$_3$, and T$_4$ through their outlets XMIT$_2$, XMIT$_3$, and XMIT$_4$. The Digital Network's ability to do this depends upon utilization of the broadcast facility at the edge common to the four terminals. In this example, information received from T$_1$ is delivered to T$_2$, T$_3$, and T$_4$ within one data frame time. Zero frame delay means that the delay time from reception of $[X_F]$ on inlet Receive Channel RCVE, to the retransmission of $[X_F]$ on outlet channel XMIT is only the channel-to-channel delay, less than one whole frame time. In this example, unity scaling is assumed in all of the data transfers from T$_1$ to T$_2$, T$_3$, and T$_4$.

If Receive Channel RCVE$_1$ were to serve as the inlet to a terminating simplex path rather than to Terminal T$_1$, then this edge and its associated broadcast facility would be a part of a multiple edge broadcast system.

An example of a multiple edge broadcast system employing multiple broadcast facilities is shown with reference to FIG. 8. An alternative theoretical representation of the same system is shown with reference to FIG. 9.

Figure 9:
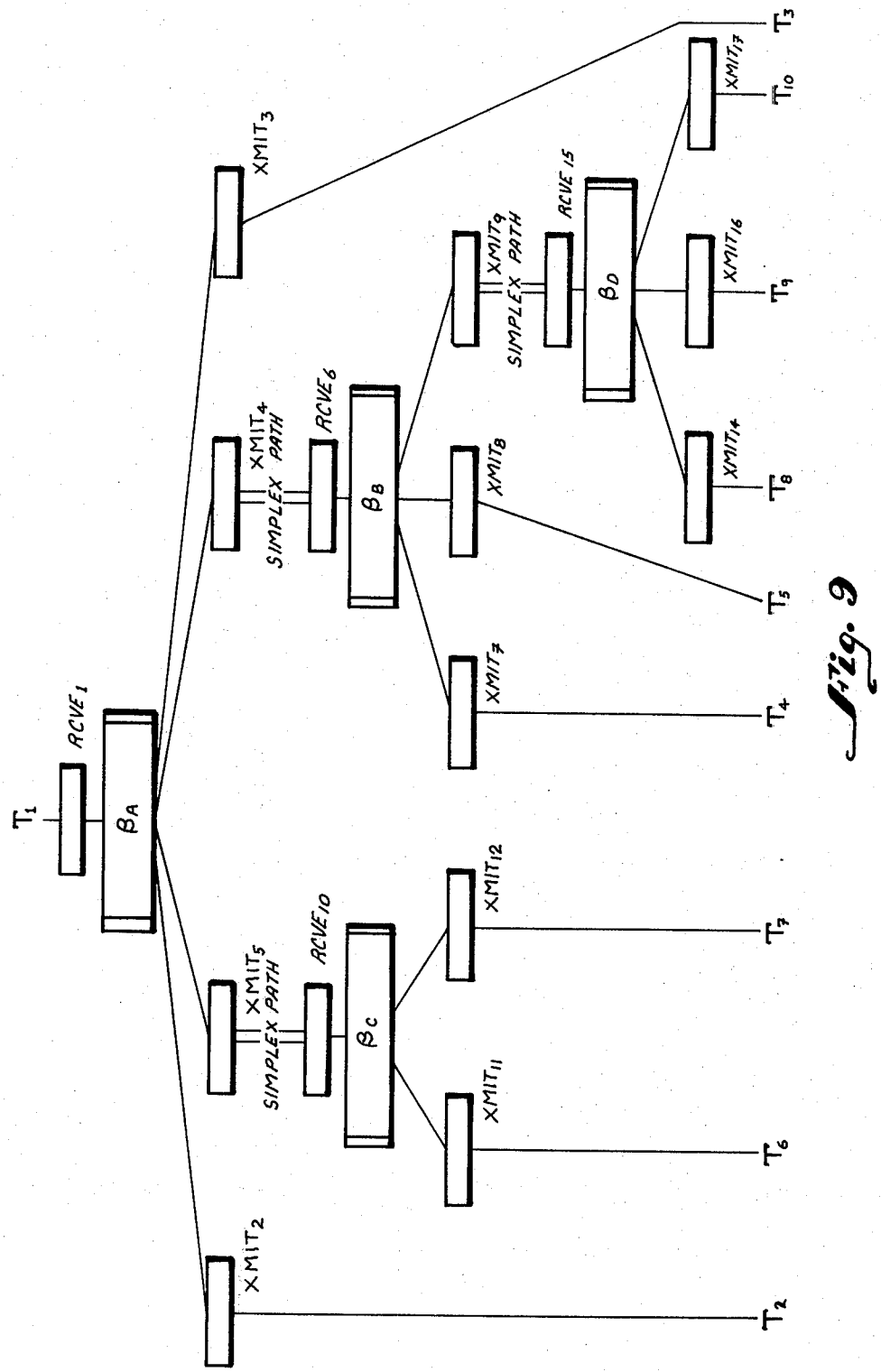
FIG. 9 is illustrative of the use of the system of FIG. 8 to obtain multiple use of broadcast facilities at the network edges.

In the exemplary theoretical multiple edge systems illustrated by FIGS. 8 and 9, Terminal T$_1$ represents an information source delivering digitized information to the digital network through its inlet RCVE$_1$ channel. In the illustrated example, the broadcast system serves to transmit this digitized information with zero loss to Terminals T$_2$ through T$_{10}$, which are connected at network edges A, B, C, and D. In order for the broadcast system to deliver information, for example, to T$_{10}$, the broadcast facility at edge A (B$_A$) functions to transfer information to channel XMIT$_4$, which is associated with an originating simplex path that appears at edge B as a terminating simplex path associated with RCVE$_6$ channel from which information is transferred to XMIT$_9$ channel by the broadcast facility at edge B (B$_B$). XMIT$_9$ channel is associated with an originating simplex path that appears at edge D of the network as a terminating simplex path associated with RCVE$_{15}$ channel from which information is transferred to XMIT$_{17}$ channel by the broadcast facility at edge D of the network. XMIT$_{17}$ channel is associated with T$_{10}$ and serves as its outlet from the digital network. Because of the use of multiple broadcast facilities and the employment of simplex paths through the digital network, zero frame delay is not, in general, possible in the course of the transfer of information to all terminals, since there are only a limited number of channels per frame. In the case of the transfer of data to T$_{10}$, this frame delay is represented as D.

Figure 10:
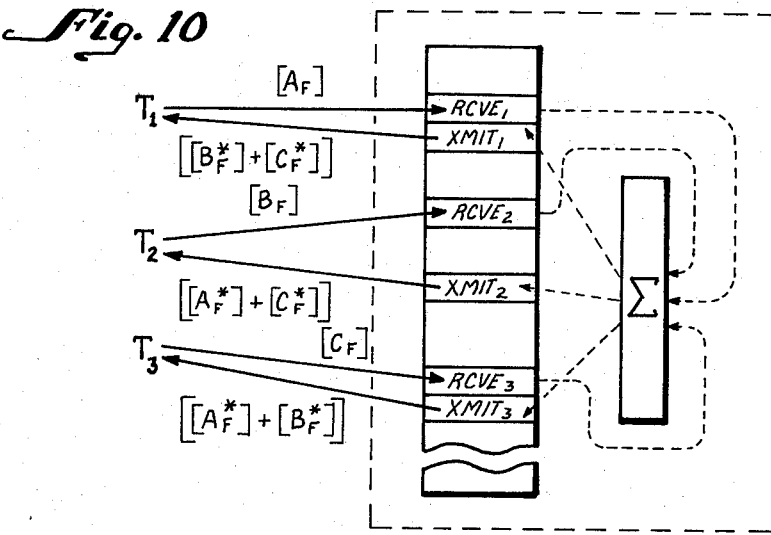
FIG. 10 illustrates a 3-way conference at a single network edge.

The preferred formation of a conferencing system (represented as $\Sigma$) involves the utilization of one conferencing facility as described herein. FIG. 10 is illustrative of one case of a conferencing system employing one conferencing facility and limited to one edge of a digital network. In the illustrated example, three terminals T$_1$, T$_2$ and T$_3$ are conferenced (interconnected) together at the point where all three terminals are connected to the same edge. In this example, the conferencing facility uses unity scaling and for the sample data transfers shown, it is assumed that clipping does not occur. The inlet from Terminal T$_1$ is RCVE$_1$ channel and the inlet from Terminal T$_2$ is RCVE$_2$ channel. During a given frame time F, the currently available information from Terminal T$_1$—either $[A_F]$ or $[A_{F-1}]$—is algebraically added to the currently available information from Terminal T$_2$—either $[B_F]$ or $[B_{F-1}]$—and is then coupled to Terminal T$_3$ through its outlet channel from the digital network channel XMIT$_3$. Equivalent transfers as shown in FIG. 10 are made to Terminals $T_1$ and $T_2$ to complete this 3-way conference.

Figure 11:
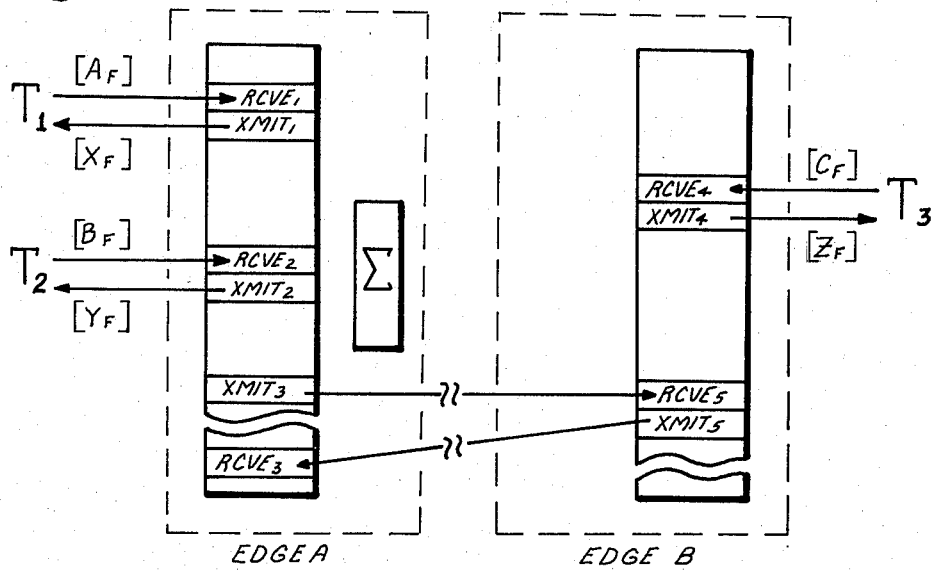
FIG. 11 illustrates a 3-way conference with two network edges and one conference facility.

An example of a conferencing system having two edges is illustrated by FIG. 11. In this example, three Terminals $T_1$, $T_2$, and $T_3$ are conferenced together. Terminals $T_1$ and $T_2$ are connected at edge A and Terminal $T_3$ is connected at edge B of the digital network. In this example, unity scaling is again employed; and it is assumed that for the sample transfers shown clipping does not occur.

The inlet from Terminal $T_1$ is channel $RCVE_1$ and the inlet from Terminal $T_2$ is channel $RCVE_2$. During a given frame time F, the currently available information from Terminal $T_1$—either $[A_F]$ or $[A_{F-1}]$, which is represented as $[A_F^*]$, and the currently available information from $T_2$, $[B_F^*]$, are summed and transmitted through channel $XMIT_3$ to an originating simplex connection that appears at edge B as a terminating simplex connection associated with channel $RCVE_5$. At edge B, the standard switching function of the network transfers information from channel $RCVE_5$ to channel $XMIT_4$, which is the outlet to Terminal $T_3$. In this way, the sum signal $[Z_F] = [[A^*_{F-D}] + [B^*_{F-D}]]$ is formed, passed through the digital network, and coupled to $T_3$. This simplex path is one portion of a complementary pair of simplex paths between network edges A and B. The other portion involves an originating simplex path at edge B associated with channel $XMIT_5$ that appears as a terminating simplex path at edge A associated with channel $RCVE_3$. At edge A, the sum of the information from $T_1$, $[A^*_F]$ in channel $RCVE_1$, and that from $T_3$, $[C^*_{F-D}]$ in $RCVE_3$ are summed to form $[Y_F] = [[A^*_F] + [C^*_{F-D}]]$ which is outpulsed to $T_2$ through channel $XMIT_2$. Also, the information from $T_2$, $[B^*_F]$ in channel $RCVE_2$, and that from $T_3$, $[C^*_{F-D}]$ in $RCVE_3$ are summed to form $[X_F] = [[B^*_F] + [C^*_{F-D}]]$, which is outpulsed to $T_i$ through channel $XMIT_1$, to complete this illustrative 3-way conference.

FIG. 12 is illustrative of a broadcast (B) facility at a single network edge which can support more than one concurrent implementation of a broadcast system at that edge. Transmit Channels, $XMIT_3$ through $XMIT_j$ serve as information destinations for information originating from channel $RCVE_1$. Similarly, Transmit Channels $XMIT_{j+1}$ through $XMIT_N$ serve as information destinations for information obtained from $RCVE_2$. Both implementations of the broadcast facility are independent of each other and operate simultaneously. The instantaneous actual number of independent, concurrent, and distinct uses of the broadcast facility at a given network edge is determined by the number of disjoint sets of Transmit Channels handled by the facility. Two Transmit Channels belong to the same set if they are a destination for information obtained from the same RCVE source.

Figure 13:
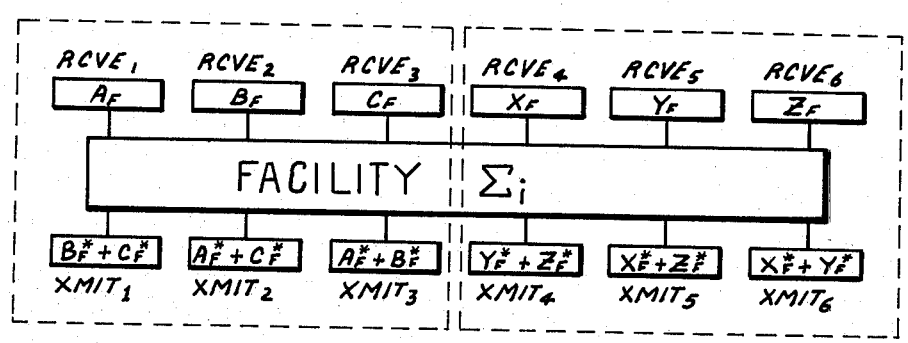
FIG. 13 illustrates two conferencing systems using a common conference facility at a single network edge.

FIG. 13 illustrates a single conferencing facility at a given network edge which can support more than one concurrent implementation of a conferencing system at that edge. In FIG. 13, two concurrent implementations of the single conferencing facility are illustrated. The implementation could have any scaling coefficient or function associated with the signal summations.

HARDWARE IMPLEMENTATION OF INVENTION

Figure 14:
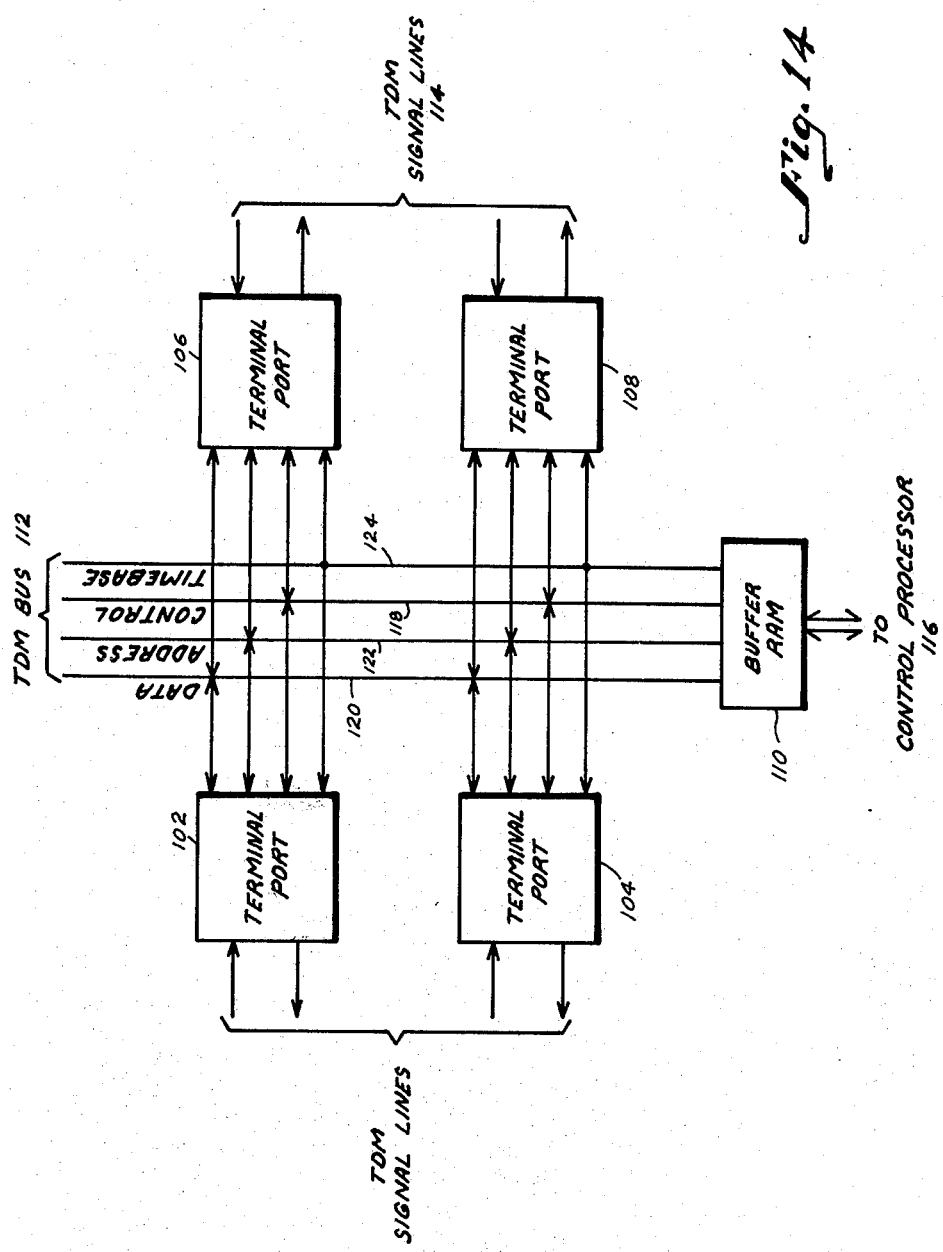
FIG. 14 is a block diagram of terminal port interconnection to enable broadcast and conferencing operation.

Referring to FIG. 14, a simplified block diagram of broadcast and conferencing facilities implemented by terminal interface circuitry is illustrated. The terminal ports are of modular construction, as fully described with reference to the switchports in copending U.S. Patent Application Ser. No. 888,582 and in detail herein with reference to FIG. 15. Terminal interface 100 is comprised of a plurality of terminal ports, of which four—102, 104, 106 and 108— are illustrated. The terminal ports are interconnected to each other and to a buffer RAM 110 by a common Time Division Multiplexed (TDM) bus 112 over which bus data, address, control and timing signals are transmitted. Each terminal port, such as port 102, includes control circuitry and provides an interface between one TDM bi-directional signal line 114 carrying several channels of information, and the TDM bus 112. The TDM bus 112 functions to transfer signals from port-to-port, port-to-RAM 110, or RAM 110-to-port.

The TDM signal line 114 is a multichannel, TDM line which uses bit-serial transmission in this implementation, and has operational characteristics similar to those of line 312 described in the copending A. Lawrence, et al patent application. In addition to the paths provided by the TDM bus 112 between terminal ports and buffer RAM 110, a path is provided from RAM 110 to control processor 116, thereby establishing a control path between control processor 116 and the terminal ports, such that control commands pass first into RAM 110 prior to processing at the terminal ports. Responses from the terminal ports are coupled to buffer RAM 110, where they are read by the control processor. These commands are used to set up various actions accomplished by bus 112, as follows:

(1) Port-to-port This is a transfer of information from one channel on one TDM signal line to one channel of another (or the same) TDM signal line;

(2) Port-to-RAM (PUT) This is a transfer of information from one channel of one TDM signal line into one addressed buffer RAM memory location;

(3) Port-from-RAM (FETCH) This is a transfer of information from one addressed buffer RAM memory location into one addressed TDM signal line channel; and (4) Port-from-multiple-RAM Locations (Conference FETCH) This is a transfer of information from two or more designated buffer RAM locations into an algebraic adder, and transfer of this sum into a specified channel of the outgoing TDM signal line.

Figure 15:
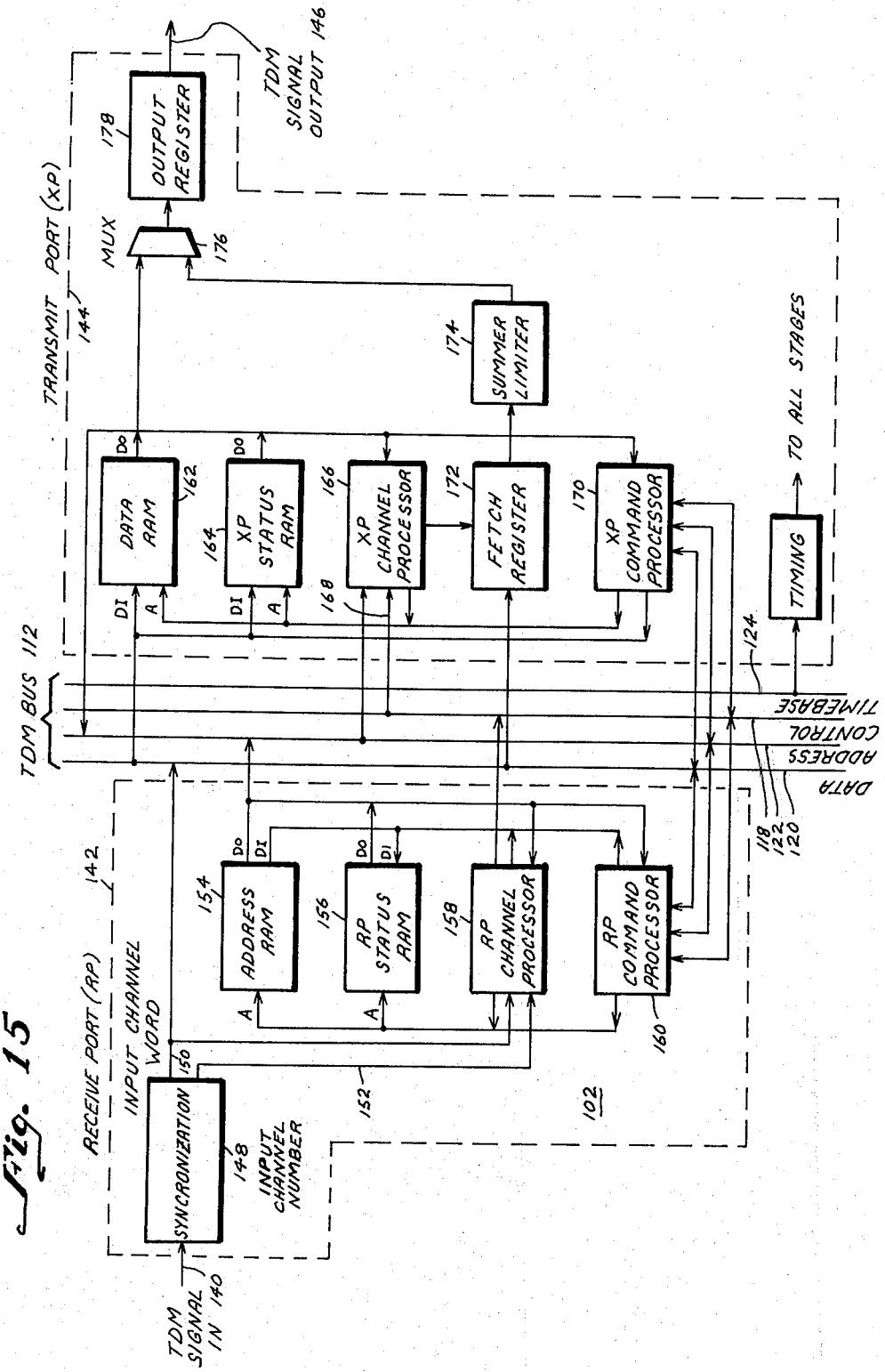
FIG. 15 is a block diagram of a terminal port illustrative portions thereof relating to broadcast and conferencing operation.

Referring now to FIG. 15, a block diagram of a single terminal port 102 is illustrated, showing those port elements required for broadcast and conference operations and for the control thereof. TDM input signals are coupled via line 140, being the incoming line of TDM signal line 114, to the receive port 142 of terminal port 102. Terminal port 102 also includes a transmit port 144 which, together with receive port 142 are intercoupled to TDM bus 112. Receive port 142 provides an interface between the input TDM signal line 140 and the TDM bus 112, and includes its own control circuitry. The transmit port 144 provides an interface between TDM bus 112 and the output TDM signal line 146, being the outgoing line of TDM signal line 114, and also includes its own control circuitry.

TDM bus 112 includes four line groups; data lines 120, over which information is carried to and from RAM 110 or from a Receive port to a Transmit port; address lines 122, which select either an address within the memory of RAM 110 or destination terminal port number and channel number within the destination terminal port; control lines 118, which control bus actions; and timebase lines 124, over which timing signals are provided to synchronize the terminal ports and the control processor 116 to achieve synchronous TDM bus interactions.

Receive port 142 synchronization circuit 148 has coupled thereto the incoming channelized TDM signal on line 140. Synchronization circuit 148 generates a pair of output signals synchronized to the incoming TDM signal; the received channel words in sequence on line 150 and a signal representative of the channel number (0-31 in PCM transmission) on line 152 of the channel word on line 150.

Receive port 142 ADDRESS RAM 154 contains the destination address for the input channel words received on every incoming channel. The destination address is either an address in buffer RAM 110 or an address corresponding to the number of the particular terminal port and the channel address within that particular terminal port (102, 104, 106, or 108 in FIG. 14) to which the received channel word is to be transferred. Receive port status RAM 156 has stored therein data representative of the current status of each channel of the incoming TDM frame. The instantaneous channel status may be caused by past commands and/or the data contained within previously received channel words. Essentially, the status RAM 158 serves to command the receive port channel processor 158 what bus actions to execute. The receive port channel processor 158, in addition to controlling TDM bus 112 operations, also modifies the contents of the address and status RAMs 154 and 156, respectively, to update destination address and channel status, respectively. The function of processor 158 is dependent upon the contents of status RAM 156, the received channel word, and on timing derived by local timing circuitry which is synchronized via timebase lines 124. Port-to-port and/or port-to-RAM data transfers are initiated by the channel processor 158. Overall operation of the terminal port 102 is controlled by the command processor 160. Commands are launched to the terminal ports by transmission to the buffer RAM 110. Receive port command processor 160 reads the command from the buffer RAM by putting the correct address on the ADDRESS bus 122, control signals on the CONTROL bus 118, and retrieving the command from the Data bus; and, at the assigned time, executes the command and responds to it by writing a reply into the buffer RAM 110, also via the TDM bus 112. The actions to be performed by the command processor 160 are the writing into address RAM 154 and into status RAM 156. By way of example, a typical port-to-RAM operation for a particular channel is established by writing the destination buffer RAM 110 address into the receive port address RAM 154 and the port-to-RAM status into the receive port status RAM 156 at the desired channel address.

Transmit port 144 receives data coupled to TDM bus 112 from the receive port 142. Transmit port data RAM 162 is used in port-to-port data transfer wherein information is transferred from one channel of one receive port, across TDM bus 112; and is temporarily stored in a designated memory location of data RAM 162 such that the designated location corresponds to the output channel number to which the information is to be switched. Thus, data RAM 162 performs the function of a buffer RAM in a time slot interchange.

On all FETCH or CONFERENCE FETCH operations for a particular transmit channel, the data RAM 162 contents for that channel is an address, or addresses for buffer RAM 110. Transmit port status RAM 164 contains data representative of the current state of each channel. One particular memory location of status RAM 164 and the same numbered memory location of data RAM 162 control the TDM signal output to the same numbered channel. All transmit port TDM bus actions are controlled by the transmit port channel processor 166, which also controls the TDM signal output and the operation of the data and status RAMs 162 and 164. Channel processor 166 has coupled thereto on line 168 control signals from control lines 118 of TDM bus 112. Channel condition information from status RAM 164 is also coupled to the channel processor 166; which, in accordance with the received status and commands, performs appropriate TDM actions and RAM control operations to generate the desired TDM output signal in its proper channel.

The transmit port command processor 170 controls overall transmit port 144 operation. In like manner, as in the receive port 142, commands are launched from the control processor 116 by placing them in the buffer RAM 110 for the ports, where they are then read by command processor 170. The commands are read and executed by command processor 170, writes the desired data into data RAM 162 and status RAM 164; and replies by writing back into buffer RAM 110. By this process, any channel may be established to receive a data transfer from a receive port, to FETCH from an assigned location of buffer RAM 110 or to perform a CONFERENCE FETCH from multiple buffer RAM locations, thereby establishing communication paths to various ports which in turn link various subscribers thru the switching network over the established conference paths.

FETCH registers 172 and SUMMER-LIMITER 174 are utilized in performing FETCH and CONFERENCE-FETCH operations. For a FETCH operation, an address (F) of a buffer RAM 110 memory location, the contents (W) of which (the data stored therein) are to be outpulsed on the TDM output signal line 146 in some designated channel (C), is retrieved from the channel number location (C) in the data RAM 162. The buffer RAM address (F) is used to address the buffer RAM 110 to retrieve the data word to be outpulsed. The retrieved word (W) is then stored in one of the FETCH registers 172 and at the appropriate channel time (C), word (W) is coupled unmodified thru SUMMER-LIMITER 174 and TDM multiplexer 176 into output register 178 from where (W) is transmitted from transmit port 144 in channel (C) of the TDM output signal via TDM line 146. SUMMER-LIMITER 174 may be comprised of a non-linear combiner producing a composite signal.

A typical broadcast operation utilizing the terminal port as described is effected as follows: A TDM signal to be broadcast is coupled to receive port 142 via line 140 in some channel. This channel is placed in the PUT mode (port-to-RAM), such that each successively received channel word is continuously written into buffer RAM 110 memory location N. Next, all of the outgoing channels on all of the terminal ports into which the signal is to be broadcast are put into the FETCH mode, reading every frame time from buffer RAM location N and outpulsing the contents into their respective channels. In this manner, one incoming TDM signal on one incoming channel may be broadcast to as many outgoing channels as there may be on a terminal interface. By cascading, a broadcast capability to any number of terminals is achievable.

Figure 16:
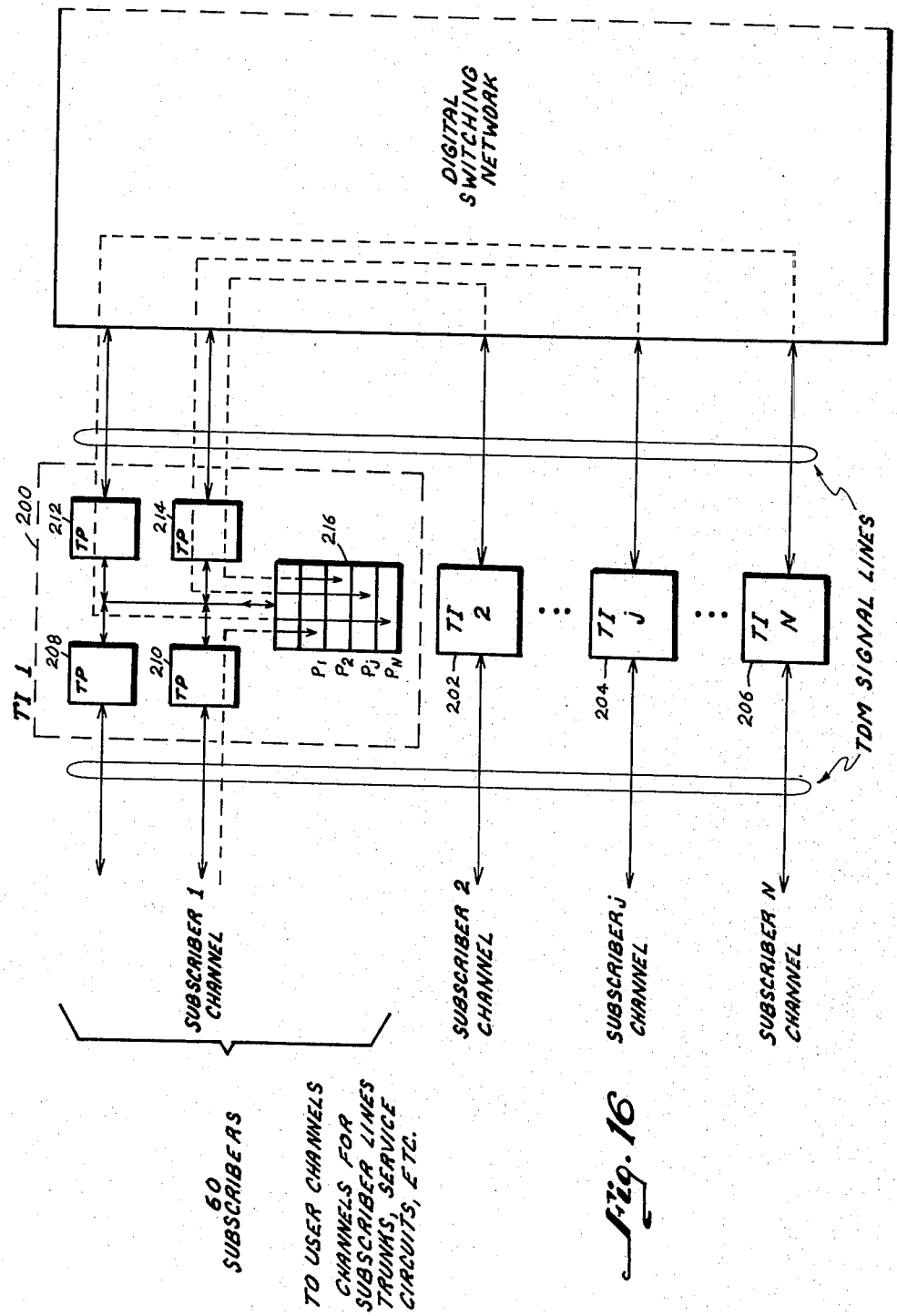
FIG. 16 is a block diagram illustrative of a conferencing operation.

Referring now to FIG. 16, a conferencing operation using the terminal ports described with reference to FIG. 15 in a terminal interface is illustrated. The terminal interface circuits are interconnected thru a full availability digital switching network by connection of at least one TDM signal line of each terminal interface to the network, which is described in detail in copending application Ser. No. 888,582 of A. Lawrence, et al. The remaining terminal interface TDM signal lines are connected to terminals (or user devices) such as telephone subscriber lines, trunks, service circuits, etc. to achieve any normal telephone connection.

An N-way conference is achieved as follows:

Assuming that the N subscribers to be conferenced are connected to N separate terminal interfaces, subscriber 1 is connected to terminal interface 1 shown at 200, subscriber 2 is connected to terminal interface 2 shown at 202, subscriber j is connected to terminal interface j shown at 204 and subscriber N is connected to terminal interface N shown at 206. One terminal interface is selected to perform the conferencing operation, for example, terminal interface 1. Duplex paths are then established from the other N−1 terminal interfaces into terminal interface 1. At terminal interface 1, all N incoming channels (i.e. the channels from subscriber 1, subscriber 2, . . . subscriber N) are put into the PUT mode (port-to-RAM) at the receive port of terminal ports 208, 210, 212, 214; thereby PUT-ing channel information into buffer RAM 216 locations $P_1, P_2, P_j \ldots P_n$ as illustrated. Each outgoing channel of the conference is then put into the CONFERENCE FETCH mode with N−1 fetch addresses, each representative of a different terminal interface subscriber address. The transmit port channel feeding subscriber 1 has FETCH addresses $P_2, P_3, \ldots P_n$. The transmit port channel feeding subscriber 2 has addresses $P_1, P_3, \ldots P_n$, etc. The transmit port channel feeding channel j has fetch addresses $P_1, P_2, \ldots P_{j-1}, P_{j+1}, \ldots P_n$, i.e. all channels but j. It is thus apparent that conferencing channels are established to enable each conferenced subscriber to be connected to the signals from the other N−1 subscriber to enable an N-way conference. Actual interconnection is thru paths established thru switching matrix 220.

While the present invention has been described in connection with a preferred embodiment thereof, it is to be understood that additional embodiments, modifications and applications which will become obvious to those skilled in the art are included within the spirit and scope of the invention as set forth by the claims appended hereto.

What is claimed is:

1. A digital telecommunication system having a simultaneous broadcast capability for frames of digitally encoded data in a plurality of channels originating at one or more sources comprising:

a plurality of terminal port means for receiving frames of said digitally encoded data from a plurality of sources;

time division multiplex bus means coupled to said plurality of terminal port means for providing a time division multiplex path between said terminal port means;

memory means coupled to said bus means for selectively storing frames of data coupled to said bus means from one or more of said plurality of terminal port means;

means for conditioning designated terminal port means to selectively access said memory means to fetch said data stored therein over said bus means to the designated terminal port means; and means for coupling said fetch data to an output of each of the designated terminal ports.

2. A digital telecommunication system in accordance with claim 1, wherein said memory means is a random access memory.

3. A digital telecommunication system in accordance with claim 1, wherein said conditioning means includes a control processor for coupling control data onto said bus and reading the contents of said memory.

4. A digital telecommunication system in accordance with claim 1, wherein each terminal port further comprises:

a receive port for providing an interface between said incoming frames of data and said bus means; and a transmit port for providing an interface between said bus means and the output TDM signal from said terminal port.

5. A digital telecommunication system in accordance with claim 4, wherein said transmit port includes means for effecting a port-to-port data transfer of data from one channel of a receive port means over the time division multiplex bus means, into one channel of a transmit port means, temporarily storing said data in a random access memory at a location therein corresponding to the number of the designated output channel.

6. A digital telecommunication system in accordance with claim 1, wherein said digitally encoded data is PCM encoded speech samples time multiplexed in said channels.

7. A digital telecommunication system in accordance with claim 3, wherein said control processor includes means for transferring data from one channel of one of said sources into a specified location in said memory means.

8. A digital telecommunication system in accordance with claim 3, wherein said control processor includes means for performing a FETCH.

9. A digital telecommunication system in accordance with claim 3, wherein said control processor includes means for performing a CONFERENCE FETCH.

10. A digital telecommunication system for providing a plurality of conferencing functions simultaneously between a plurality of terminals having frames of digitally encoded data in a plurality of channels originating at one or more sources coupled thereto, comprising:

a plurality of terminal port means for receiving frames of said digitally encoded data from a plurality of terminals;

means for providing a plurality of duplex paths over a plurality of time division multiplex bus means between said terminal ports to be interconnected thru a digital switching network;

memory means coupled to said bus means for selectively storing frames of data coupled to said bus means from one or more of said plurality of terminal port means;

means at each terminal port for coupling said frames of digitally encoded data of each channel into said memory means coupled to said bus means, said bus means being coupled to a plurality of terminal ports;

means for recalling said frames of digitally encoded data from said memory means such that the contents of a plurality of said memory locations are combined to form a sum; and means for transmitting a signal representative of said sum over said established communication path.

11. A digital telecommunication system in accordance with claim 10, wherein each of said terminals corresponds to a telephone subscriber line.

12. A digital telecommunication system in accordance with claim 10, wherein said digitally encoded data comprises PCM encoded speech samples time multiplexed in said channels.

13. A digital telecommunication system in accordance with claim 10, wherein each of said terminal port means includes:

receive port means for transferring digitally encoded data from one channel of said signal line into a specified memory location; and transmit port means for FETCHing said data from a plurality of said memory locations and establishing a conference path between the addressed terminal ports.

14. A digital telecommunication system in accordance with claim 10, wherein said memory is a random access memory.

* * * * *